June 14, 1927.

J. L. BALDWIN

CLUTCH

Filed Jan. 19, 1925

1,632,159

Inventor:-
James L. Baldwin

By Milo B. Stevens Co.
Attorneys.

Patented June 14, 1927.

1,632,159

UNITED STATES PATENT OFFICE.

JAMES L. BALDWIN, OF CHICAGO, ILLINOIS.

CLUTCH.

Application filed January 19, 1925. Serial No. 3,470.

This invention relates to clutches for power transmission and more particularly to low speed drives, its object being to provide a mechanism for this purpose which is entirely automatic.

A further object of the invention is to provide a clutch which engages and releases quietly and with ease, and requires no adjustment in that connection.

A still further object of the novel clutch is to embody an element which assures the necessary frictional engagement, yet induces an immediate release upon a stoppage of the driving element.

Another object of the invention is to employ the principle of centrifugal force but in part, so that the action of engagement will not be entirely dependent on the speed of the driving element, as in the usual types of centrifugal clutches, making the present clutch particularly fitted for slow speed machinery.

Still another object of the novel clutch is to design it so that it will not be subject to strains, binding, bucking or rattling to jar it loose or in any way impede the continuity and efficiency of its operation.

A final but nevertheless important object of the invention is to design it with few parts of least size consistent with ample strength, whereby the structure may be of a simple character and inexpensive to manufacture.

With the above objects in view, the invention comprses a novel combination and arrangement of parts to be described and claimed hereinafter, reference being had to the accompanying drawing, in which—

Figure 1:
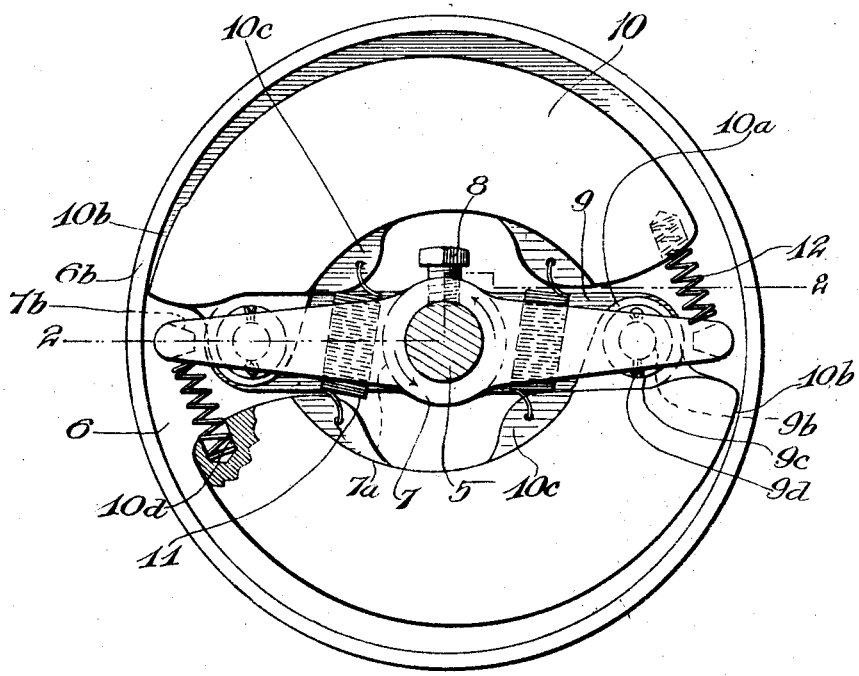
Figure 2:
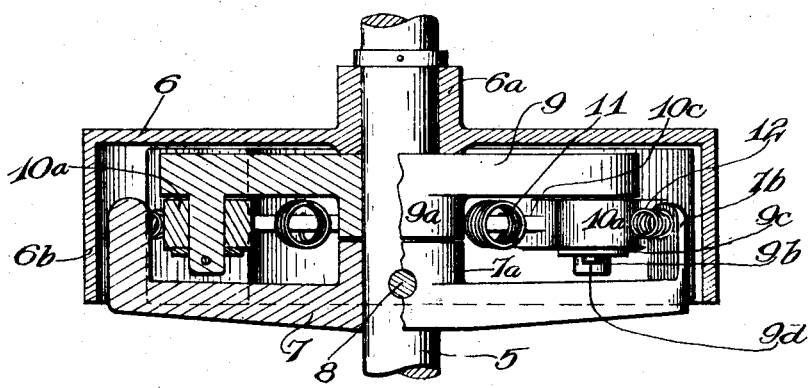

Figure 1 is a face view of the clutch, and Fig. 2 is a section on the lire 2—2 of Fig. 1.

Referring specifically to the drawing, 5 denotes the power or drive shaft of the clutch, and 6 the driven member, which is preferably a cup or open drum with a hub 6ª, freely rotatable on the shaft 5. Power from the drum may be taken by means of a belt, or the drum may be equipped with or attached to a gear or sprocket in case a belt drive is not desirable.

The shaft 5 receives a two-armed spider 7 at the entrance of the drum, this spider having a hub 7ª and being rigidly held on the shaft by a set screw 8 or other suitable device. Next on the shaft, between the spider hub 7ª and the back of the drum, is an inner spider 9 with a hub 9ª, freely rotatable on the shaft.

The ends of the inner spider 9 have outwardly projecting stubs 9ᵇ on which are impaled the apertured terminal ears 10ª of a pair of arcuately formed levers 10. These are shaped in symmetry with the spaces inside the drum, and are only supported at the ends from which the ears 10ª are formed. The connections on the studs 9ᵇ are each completed by a washer 9ᶜ and cotter pin 9ᵈ.

The levers 10 are of heavy stock, being intended to act in part as weights; and near its connections with the spider 9 the periphery or outer edge of each lever is raised to form a shoe 10ᵇ which will seat against and frictionally engage the inside of the drum rim 6ᵇ when the lever is swung outwardly on its pivot stud 9ᵇ.

The levers 10 are normally drawn inwardly by a pair of coil springs 11 hung between them, the ends of each spring being hooked into a pair of perforated webs 10ᶜ projecting from the inner sides of the levers. The springs 11 are of a light character, exercising only sufficient tension on the levers to check them from needless oscillation or freedom and resultant chatter or other noise.

The outer spider 7 has an inwardly directed prong 7ᵇ at each end, these prongs being slightly tapered toward the shaft 5. The object of the tapered design is to render each prong a direct abutment for a small coil spring 12 extending from a cavity 10ᵈ in the free end of each lever 10, the spring terminating slightly short of the prong under normal conditions.

To demonstrate the operation of the clutch, let it be assumed that the shaft 5 is started on its proper motion in the direction of the arrows in Fig. 1. The outer spider 7 being fast on the shaft, will also be turned so that its prongs 7ᵇ will impinge on the springs 12 and through them on the free ends of the levers 10. This force will cause the latter to swing outwardly and frictionally engage the drum rim 6ᵇ, as previously outlined, setting the drum in motion. As the speed of the shaft increases to normal, the levers will by virtue of centrifugal force exert a further pressure on the drum rim whereby to gain a firm and steady hold thereon. It will be seen that with the center-springs 11 lightly designed, as mentioned, a comparatively low working speed of the shaft will suffice to spread the levers 10 into the necessary frictional engagement with the drum. Conversely, when the shaft is about to cease turning, the loss of centrifugal force together with the gathering tension of the center springs 11 will usually cause the levers to recede from the drum rim so as to release the clutch. However, in case the frictional engagement is so firm as to retard the release of the clutch, another element acts to assure a release as follows: During the driving action the outer spider 7 impinging on the outer springs 12—through the agency of the prongs 7ᵇ—causes the said springs to be compressed to a considerable degree and to so remain as long as the spider exerts a driving force. However, when the shaft and the spider cease to turn, the inherent tendency of the springs 12 to re-expand to normal length draws on the levers in the direction in which such springs re-expand, namely, away from the free ends of the levers 10. This action—as actually demonstrated by a number of these clutches which have been in operation—exercises a tug upon the levers in the inward or releasing direction.

It will be seen that the clutch described in the foregoing is not only simple in construction and operation, but is peculiarly designed to operate on low speed shafting with ease and quiet and unfailing automatic action on engagement and release. With no undue strain imposed on any part, no delicate parts involved, and no adjustments necessary, it will be obvious that the appliance may be depended upon to operate efficiently for long periods without any attention whatsoever.

I claim:

1. A clutch comprising a drive shaft, a driver fast thereon, a driven element loose on the shaft, a centrifugally acting intermediate element engageable with the driven element, and a resilient element interposed between said driver and the centrifugally acting intermediate element for automatically transmitting pressure from the driver to the said intermediate element whereby to cause the engagement thereof with the driven element immediately the driver is started, the said resilient element holding the intermediate element in engagement with the driven element while the driver is moving at slow speeds and cooperating with centrifugal force to hold said intermediate element in engagement with said driven element when the driver is moving at high speeds.

2. A clutch comprising a drive shaft, a driver fast thereon, a driven element loose on the shaft, a centrifugally acting intermediate element engageable with the driven element, and a resilient element carried by the intermediate element and interposed between said driver and the centrifugally acting intermediate element for automatically transmitting pressure from the driver to the said intermediate element whereby to cause the engagement thereof with the driven element immediately the driver is started, the said resilient element holding the intermediate element in engagement with the driven element while the driver is moving at slow speeds and cooperating with centrifugal force to hold said intermediate element in engagement with said driven element when the driver is moving at high speeds.

3. A clutch comprising a drive shaft, a driver fast thereon, a driven element loose on the shaft, an intermediate element engageable with the driven element, means maintaining the intermediate element in disengagement while the driver is inactive, and a resilient element transmitting pressure from the driver to said intermediate element whereby to cause the engagement thereof with the driven element.

4. A clutch comprising a drive shaft, a driver fast thereon, a driven element loose on the shaft, an intermediate element engageable with the driven element, means maintaining the intermediate element in disengagement while the driver is inactive, and a resilient element carried by the intermediate element and transmitting pressure from the driver to the said intermediate element whereby to cause the engagement thereof with the driven element.

5. A clutch comprising a drive shaft, a driver fast thereon, a driven element loose on the shaft, a centrifugally acting intermediate element loose on the shaft engageable with the driven element, and a resilient element interposed between said driver and the centrifugally acting intermediate element for automatically transmitting pressure from the driver to the said intermediate element whereby to cause the engagement thereof with the driven element, immediately the driver is started, the said resilient element holding the intermediate element in engagement with the driven element while the driver is moving at slow speeds and cooperating with centrifugal force to hold said intermediate element in engagement with said driven element when the driver is moving at high speeds.

6. A clutch comprising a drive shaft, a driver fast thereon, a driven element loose on the shaft, a centrifugally acting intermediate element loose on the shaft engageable with the driven element, and a resilient element carried by the intermediate element and interposed between said driver and the centrifugally acting intermediate element for automatically transmitting pressure from the driver to the said intermediate element whereby to cause the engagement thereof with the driven element immediately the driver is started, the said resilient element holding the intermediate element in engagement with the driven element while the driver is moving at slow speeds and cooperating with centrifugal force to hold said intermediate element in engagement with said driven element when the driver is moving at high speeds.

7. A clutch comprising a drive shaft, a driver fast thereon, a driven element loose on the shaft, an intermediate element loose on the shaft engageable with the driven element, means maintaining the intermediate element in disengagement while the driver is inactive, and a resilient element transmitting pressure from the driver to said intermediate element whereby to cause the engagement thereof with the driven element.

8. A clutch comprising a drive shaft, a driver fast thereon, a driven element loose on the shaft, an intermediate element loose on the shaft engageable with the driven element, means maintaining the intermediate element in disengagement while the driver is inactive, and a resilient element carried by the intermediate element and transmitting pressure from the driver to the said intermediate element whereby to cause the engagement thereof with the driven element.

9. A clutch comprising a drive shaft, a driver fast thereon, a drum loose on the shaft, a spider between the driver and the drum and loose on the shaft, pivoted levers carried by the spider and frictionally engageable with the wall of the drum, springs drawing the levers out of engagement while the driver is inactive, and springs to transmit the pressure of the driver to the levers whereby the latter are moved into engagement.

10. A clutch comprising a drive shaft, a driver fast thereon, a drum loose on the shaft, a spider between the driver and the drum and loose on the shaft, pivoted levers carried by the spider and frictionally engageable with the wall of the drum, springs drawing the levers out of engagement while the driver is inactive, and springs carried by the levers to transmit the pressure of the driver to the levers whereby the latter are moved into engagement.

11. A clutch comprising a drive shaft, a drum loose thereon, a driver fast on the drive shaft and having terminal prongs directed into the drum, a spider between the driver and the drum and loose on the shaft, pivoted levers carried by the spider and frictionally engageable with the wall of the drum, springs drawing the levers out of engagement while the driver is inactive and springs to transmit the pressure of the driver through its terminal prongs to the levers whereby the latter are moved into engagement.

12. A clutch comprising a drive shaft, a drum loose thereon, a driver fast on the drive shaft and having terminal prongs directed into the drum, a spider between the driver and the drum and loose on the shaft, pivoted levers carried by the last named spider and frictionally engageable with the wall of the drum, springs drawing the levers out of engagement while the driver is inactive and springs carried by the levers to transmit the pressure of the driver through its terminal prongs to the levers whereby the latter are moved into engagement.

In testimony whereof I affix my signature.

JAMES L. BALDWIN.